(12) United States Patent
Hanna

(10) Patent No.: US 9,965,672 B2
(45) Date of Patent: May 8, 2018

(54) METHOD OF REDUCING VISIBILITY OF PULSED ILLUMINATION WHILE ACQUIRING HIGH QUALITY IMAGERY

(75) Inventor: Keith J. Hanna, New York, NY (US)

(73) Assignee: Eyelock LLC, New York, NY (US)

( * ) Notice: Subject to any disclaimer, the term of this patent is extended or adjusted under 35 U.S.C. 154(b) by 428 days.

(21) Appl. No.: 13/055,943

(22) Filed: Jan. 26, 2011

(65) Prior Publication Data

US 2012/0187838 A1   Jul. 26, 2012
US 2014/0354151 A9   Dec. 4, 2014

Related U.S. Application Data

(63) Continuation of application No. PCT/US2009/048935, filed on Feb. 26, 2009.
(Continued)

(51) Int. Cl.
    *H01K 7/00*      (2006.01)
    *G06K 9/00*      (2006.01)
    *G06K 9/20*      (2006.01)

(52) U.S. Cl.
CPC ..... *G06K 9/00255* (2013.01); *G06K 9/00604* (2013.01); *G06K 9/2018* (2013.01); *G06K 9/2027* (2013.01)

(58) Field of Classification Search
CPC ............... G06K 9/2027; G06K 9/2018; G06K 9/00604; G06K 9/00255
(Continued)

(56) References Cited

U.S. PATENT DOCUMENTS

| 4,641,349 A | 2/1987 | Flom et al. |
| 5,259,040 A | 11/1993 | Hanna |

(Continued)

FOREIGN PATENT DOCUMENTS

| JP | 09-305765 A | 11/1997 |
| JP | 11-203478 A | 7/1999 |

(Continued)

OTHER PUBLICATIONS

"Frame (video)—Wikipedia, the free encyclopedia".*
(Continued)

*Primary Examiner* — Zhihan Zhou
(74) *Attorney, Agent, or Firm* — Foley & Lardner LLP

(57) ABSTRACT

A method of providing active illumination during biometry that utilizes pulsed lighting synchronized to frame acquisition. Two distinct illumination modalities are provided: the first maximizes the quality of images captured by the imaging system, and the second minimizes the overall illumination perceived by the user in combination with the first. The two modalities are provided substantially simultaneously. The first modality always includes a set of pulses synchronized with frame acquisition. The second modality may be either a second set of pulses not synchronized with frame acquisition or constant background illumination. The two modalities may be generated by two separate sources of illumination or by the same single illumination source. Adding the second modality to the first reduces user discomfort and the chances of an epileptic response as compared to using the first modality alone. The two modalities may have different wavelengths, pulse durations, or intensities.

30 Claims, 13 Drawing Sheets

Related U.S. Application Data

(60) Provisional application No. 61/075,817, filed on Jun. 26, 2008, provisional application No. 61/185,417, filed on Jun. 9, 2009.

(58) Field of Classification Search
USPC .............................. 348/77; 382/464; 315/76
See application file for complete search history.

(56) References Cited

U.S. PATENT DOCUMENTS

| | | |
|---|---|---|
| 5,291,560 A | 3/1994 | Daugman |
| 5,488,675 A | 1/1996 | Hanna |
| 5,572,596 A | 11/1996 | Wildes et al. |
| 5,581,629 A | 12/1996 | Hanna et al. |
| 5,613,012 A | 3/1997 | Hoffman et al. |
| 5,615,277 A | 3/1997 | Hoffman |
| 5,737,439 A | 4/1998 | Lapsley et al. |
| 5,751,836 A | 5/1998 | Wildes et al. |
| 5,764,789 A | 6/1998 | Pare et al. |
| 5,802,199 A | 9/1998 | Pare et al. |
| 5,805,719 A | 9/1998 | Pare et al. |
| 5,838,812 A | 11/1998 | Pare et al. |
| 5,901,238 A | 5/1999 | Matsushita |
| 5,953,130 A * | 9/1999 | Benedict et al. ............. 356/429 |
| 5,953,440 A | 9/1999 | Zhang et al. |
| 5,978,494 A | 11/1999 | Zhang |
| 6,021,210 A | 2/2000 | Camus et al. |
| 6,028,949 A | 2/2000 | McKendall |
| 6,055,322 A | 4/2000 | Salganicoff et al. |
| 6,062,475 A * | 5/2000 | Feng ....................... 235/462.06 |
| 6,064,752 A | 5/2000 | Rozmus et al. |
| 6,069,967 A | 5/2000 | Rozmus et al. |
| 6,088,470 A | 7/2000 | Camus et al. |
| 6,144,754 A | 11/2000 | Okano et al. |
| 6,192,142 B1 | 2/2001 | Pare et al. |
| 6,246,751 B1 | 6/2001 | Bergl et al. |
| 6,247,813 B1 | 6/2001 | Kim et al. |
| 6,252,977 B1 | 6/2001 | Salganicoff et al. |
| 6,289,113 B1 | 9/2001 | McHugh et al. |
| 6,366,682 B1 | 4/2002 | Hoffman et al. |
| 6,373,968 B2 | 4/2002 | Okano et al. |
| 6,377,699 B1 | 4/2002 | Musgrave et al. |
| 6,424,727 B1 | 7/2002 | Musgrave et al. |
| 6,483,930 B1 | 11/2002 | Musgrave et al. |
| 6,532,298 B1 | 3/2003 | Cambier et al. |
| 6,542,624 B1 | 4/2003 | Oda |
| 6,546,121 B1 | 4/2003 | Oda |
| 6,554,705 B1 | 4/2003 | Cumbers |
| 6,594,376 B2 | 7/2003 | Hoffman et al. |
| 6,594,377 B1 | 7/2003 | Kim et al. |
| 6,652,099 B2 | 11/2003 | Chae et al. |
| 6,700,998 B1 | 3/2004 | Murata |
| 6,714,665 B1 * | 3/2004 | Hanna et al. ................. 382/117 |
| 6,760,467 B1 | 7/2004 | Min et al. |
| 6,819,219 B1 | 11/2004 | Bolle et al. |
| 6,850,631 B1 | 2/2005 | Oda et al. |
| 6,914,629 B1 * | 7/2005 | Hurwitz et al. ............. 348/296 |
| 6,917,695 B2 | 7/2005 | Teng et al. |
| 6,944,318 B1 | 9/2005 | Takata et al. |
| 6,950,536 B2 | 9/2005 | Houvener |
| 6,966,681 B2 * | 11/2005 | Stephan et al. ............... 362/464 |
| 6,980,670 B1 | 12/2005 | Hoffman et al. |
| 6,985,608 B2 | 1/2006 | Hoffman et al. |
| 7,007,298 B1 | 2/2006 | Shinzaki et al. |
| 7,020,351 B1 | 3/2006 | Kumar et al. |
| 7,047,418 B1 | 5/2006 | Ferren et al. |
| 7,095,901 B2 | 8/2006 | Lee et al. |
| 7,146,027 B2 | 12/2006 | Kim et al. |
| 7,152,782 B2 | 12/2006 | Shenker et al. |
| 7,248,719 B2 | 7/2007 | Hoffman et al. |
| 7,271,939 B2 | 9/2007 | Kono |
| 7,346,472 B1 | 3/2008 | Moskowitz et al. |
| 7,385,626 B2 | 6/2008 | Aggarwal et al. |
| 7,398,925 B2 | 7/2008 | Tidwell et al. |
| 7,414,737 B2 | 8/2008 | Cottard et al. |
| 7,418,115 B2 | 8/2008 | Northcott et al. |
| 7,428,320 B2 | 9/2008 | Northcott et al. |
| 7,542,590 B1 | 6/2009 | Robinson et al. |
| 7,545,962 B2 | 6/2009 | Peirce et al. |
| 7,558,406 B1 | 7/2009 | Robinson et al. |
| 7,558,407 B2 | 7/2009 | Hoffman et al. |
| 7,574,021 B2 | 8/2009 | Matey |
| 7,583,822 B2 | 9/2009 | Guillemot et al. |
| 7,606,401 B2 | 10/2009 | Hoffman et al. |
| 7,616,788 B2 | 11/2009 | Hsieh et al. |
| 7,639,840 B2 | 12/2009 | Hanna et al. |
| 7,660,700 B2 | 2/2010 | Moskowitz et al. |
| 7,693,307 B2 | 4/2010 | Rieul et al. |
| 7,697,786 B2 | 4/2010 | Camus et al. |
| 7,715,595 B2 | 5/2010 | Kim et al. |
| 7,719,566 B2 | 5/2010 | Guichard |
| 7,770,019 B2 | 8/2010 | Ferren et al. |
| 7,797,606 B2 | 9/2010 | Chabanne |
| 7,801,335 B2 | 9/2010 | Hanna et al. |
| 7,847,688 B2 | 12/2010 | Bernard et al. |
| 7,869,627 B2 | 1/2011 | Northcott et al. |
| 7,925,059 B2 | 4/2011 | Hoyos et al. |
| 7,929,017 B2 | 4/2011 | Aggarwal et al. |
| 7,929,732 B2 | 4/2011 | Bringer et al. |
| 7,949,295 B2 | 5/2011 | Kumar et al. |
| 7,949,494 B2 | 5/2011 | Moskowitz et al. |
| 7,978,883 B2 | 7/2011 | Rouh et al. |
| 8,009,876 B2 | 8/2011 | Kim et al. |
| 8,025,399 B2 | 9/2011 | Northcott et al. |
| 8,028,896 B2 | 10/2011 | Carter et al. |
| 8,090,246 B2 | 1/2012 | Jelinek |
| 8,092,021 B1 | 1/2012 | Northcott et al. |
| 8,132,912 B1 | 3/2012 | Northcott et al. |
| 8,159,328 B2 | 4/2012 | Luckhardt |
| 8,170,295 B2 | 5/2012 | Fujii et al. |
| 8,181,858 B2 | 5/2012 | Carter et al. |
| 8,195,044 B2 | 6/2012 | Hanna et al. |
| 8,212,870 B2 | 7/2012 | Hanna et al. |
| 8,214,175 B2 | 7/2012 | Moskowitz et al. |
| 8,233,680 B2 | 7/2012 | Bringer et al. |
| 8,243,133 B1 | 8/2012 | Northcott et al. |
| 8,260,008 B2 | 9/2012 | Hanna et al. |
| 8,279,042 B2 | 10/2012 | Beenau et al. |
| 8,280,120 B2 | 10/2012 | Hoyos et al. |
| 8,289,390 B2 | 10/2012 | Aggarwal et al. |
| 8,306,279 B2 | 11/2012 | Hanna |
| 8,317,325 B2 | 11/2012 | Raguin et al. |
| 8,364,646 B2 | 1/2013 | Hanna et al. |
| 8,411,909 B1 | 4/2013 | Zhao et al. |
| 8,442,339 B2 | 5/2013 | Martin et al. |
| 8,443,202 B2 | 5/2013 | White et al. |
| 8,553,948 B2 | 10/2013 | Hanna |
| 8,604,901 B2 | 12/2013 | Hoyos et al. |
| 8,606,097 B2 | 12/2013 | Hanna et al. |
| 8,719,584 B2 | 5/2014 | Mullin |
| 2002/0093645 A1 | 7/2002 | Heacock |
| 2002/0191388 A1 * | 12/2002 | Matveev ........................ 362/31 |
| 2004/0047146 A1 * | 3/2004 | Galoob ................. A41D 13/01 362/103 |
| 2004/0170304 A1 * | 9/2004 | Haven et al. .................. 382/115 |
| 2004/0196371 A1 * | 10/2004 | Kono et al. .................... 348/162 |
| 2005/0001926 A1 * | 1/2005 | Lee ....................... H04N 5/2354 348/371 |
| 2005/0084137 A1 | 4/2005 | Kim et al. |
| 2005/0084179 A1 | 4/2005 | Hanna et al. |
| 2005/0117172 A1 * | 6/2005 | Plamann et al. ............. 356/604 |
| 2005/0243224 A1 * | 11/2005 | Choi .................... F41H 13/0087 349/11 |
| 2005/0281475 A1 * | 12/2005 | Wilson ........................ 382/254 |
| 2006/0027021 A1 * | 2/2006 | Choi ..................... G01H 17/00 73/579 |
| 2006/0028552 A1 | 2/2006 | Aggarwal et al. |
| 2006/0043303 A1 * | 3/2006 | Safai ..................... G01N 21/954 250/347 |
| 2006/0073449 A1 | 4/2006 | Kumar et al. |
| 2006/0074986 A1 | 4/2006 | Mallalieu et al. |
| 2006/0113386 A1 * | 6/2006 | Olmstead ..................... 235/454 |
| 2006/0115130 A1 | 6/2006 | Kozlay |
| 2006/0164541 A1 * | 7/2006 | Olmstead et al. ............ 348/360 |

(56) References Cited

U.S. PATENT DOCUMENTS

| | | | |
|---|---|---|---|
| 2006/0279630 | A1 | 12/2006 | Aggarwal et al. |
| 2007/0015992 | A1* | 1/2007 | Filkins ............... A61B 5/0073 |
| | | | 600/407 |
| 2007/0110285 | A1 | 5/2007 | Hanna et al. |
| 2007/0133974 | A1* | 6/2007 | Murakami ............ G03B 15/06 |
| | | | 396/157 |
| 2007/0206839 | A1 | 9/2007 | Hanna et al. |
| 2007/0211922 | A1 | 9/2007 | Crowley et al. |
| 2008/0122578 | A1 | 5/2008 | Hoyos et al. |
| 2008/0158348 | A1* | 7/2008 | Karpen et al. .................. 348/82 |
| 2008/0291279 | A1 | 11/2008 | Samarasekera et al. |
| 2009/0074256 | A1 | 3/2009 | Haddad |
| 2009/0097715 | A1 | 4/2009 | Cottard et al. |
| 2009/0161925 | A1 | 6/2009 | Cottard et al. |
| 2009/0231096 | A1 | 9/2009 | Bringer et al. |
| 2009/0274345 | A1 | 11/2009 | Hanna et al. |
| 2010/0014720 | A1 | 1/2010 | Hoyos et al. |
| 2010/0021016 | A1 | 1/2010 | Cottard et al. |
| 2010/0074477 | A1 | 3/2010 | Fujii et al. |
| 2010/0127826 | A1 | 5/2010 | Saliba et al. |
| 2010/0232655 | A1 | 9/2010 | Hanna |
| 2010/0246903 | A1 | 9/2010 | Cottard |
| 2010/0253816 | A1 | 10/2010 | Hanna |
| 2010/0278394 | A1 | 11/2010 | Raguin et al. |
| 2010/0310070 | A1 | 12/2010 | Bringer et al. |
| 2011/0002510 | A1 | 1/2011 | Hanna |
| 2011/0007949 | A1 | 1/2011 | Hanna et al. |
| 2011/0063427 | A1* | 3/2011 | Fengler et al. ................. 348/65 |
| 2011/0119111 | A1 | 5/2011 | Hanna |
| 2011/0119141 | A1 | 5/2011 | Hoyos et al. |
| 2011/0158486 | A1 | 6/2011 | Bringer et al. |
| 2011/0194738 | A1 | 8/2011 | Choi et al. |
| 2011/0211054 | A1 | 9/2011 | Hanna et al. |
| 2011/0277518 | A1 | 11/2011 | Lais et al. |
| 2012/0127295 | A9 | 5/2012 | Hanna et al. |
| 2012/0187838 | A1 | 7/2012 | Hanna |
| 2012/0212597 | A1 | 8/2012 | Hanna |
| 2012/0219279 | A1 | 8/2012 | Hanna et al. |
| 2012/0239458 | A9 | 9/2012 | Hanna |
| 2012/0240223 | A1 | 9/2012 | Tu |
| 2012/0242820 | A1 | 9/2012 | Hanna et al. |
| 2012/0242821 | A1 | 9/2012 | Hanna et al. |
| 2012/0243749 | A1 | 9/2012 | Hanna et al. |
| 2012/0257797 | A1 | 10/2012 | Leyvand et al. |
| 2012/0268241 | A1 | 10/2012 | Hanna et al. |
| 2012/0293643 | A1 | 11/2012 | Hanna |
| 2012/0300052 | A1 | 11/2012 | Hanna et al. |
| 2012/0300990 | A1 | 11/2012 | Hanna et al. |
| 2012/0321141 | A1 | 12/2012 | Hoyos et al. |
| 2012/0328164 | A1 | 12/2012 | Hoyos et al. |
| 2013/0051631 | A1 | 2/2013 | Hanna |
| 2013/0110859 | A1 | 5/2013 | Hanna et al. |
| 2013/0162798 | A1 | 6/2013 | Hanna et al. |
| 2013/0162799 | A1 | 6/2013 | Hanna et al. |
| 2013/0182093 | A1 | 7/2013 | Hanna |
| 2013/0182094 | A1 | 7/2013 | Hanna |
| 2013/0182095 | A1 | 7/2013 | Hanna |
| 2013/0182913 | A1 | 7/2013 | Hoyos et al. |
| 2013/0182915 | A1 | 7/2013 | Hanna |
| 2013/0194408 | A1 | 8/2013 | Hanna et al. |
| 2013/0212655 | A1 | 8/2013 | Hoyos et al. |
| 2013/0294659 | A1 | 11/2013 | Hanna et al. |
| 2014/0064574 | A1 | 3/2014 | Hanna et al. |
| 2014/0072183 | A1 | 3/2014 | Hanna et al. |

FOREIGN PATENT DOCUMENTS

| | | |
|---|---|---|
| JP | 2000-322029 A | 11/2000 |
| JP | 2002-102165 A | 4/2002 |
| JP | 2003-016434 A | 1/2003 |
| JP | 2009-193197 A | 8/2009 |
| KR | 1020020078225 | 10/2002 |
| KR | 1020030005113 | 1/2003 |
| KR | 1003738500000 | 2/2003 |
| KR | 1020030034258 | 5/2003 |
| KR | 1020030051970 | 6/2003 |
| KR | 2003216700000 | 7/2003 |
| KR | 1004160650000 | 1/2004 |
| KR | 2003402730000 | 1/2004 |
| KR | 2003411370000 | 1/2004 |
| KR | 2003526690000 | 5/2004 |
| KR | 2003552790000 | 6/2004 |
| KR | 2003620320000 | 9/2004 |
| KR | 2003679170000 | 11/2004 |
| KR | 1020050005336 | 1/2005 |
| KR | 2003838080000 | 5/2005 |
| KR | 1020050051861 | 6/2005 |
| KR | 2004046500000 | 12/2005 |
| KR | 10-0565959 B1 | 3/2006 |
| KR | 1005726260000 | 4/2006 |
| KR | 1011976780000 | 10/2012 |
| KR | 1013667480000 | 2/2014 |
| KR | 1013740490000 | 3/2014 |
| KR | 1020140028950 | 3/2014 |
| KR | 1020140039803 | 4/2014 |
| KR | 1020140050501 | 4/2014 |
| WO | WO 2009158662 A2 * | 12/2009 |
| WO | WO-2010/062371 | 6/2010 |
| WO | WO-2011/093538 | 8/2011 |
| WO | WO 2012/158825 A2 | 11/2012 |

OTHER PUBLICATIONS

Daugman, John "How Iris Recognition Works," IEEE Transaction on Circuits and Systems for Video Technology, vol. 14, No. 1, pp. 21-30 (Jan. 2004) (10 pages).

International Preliminary Report on Patentability in PCT/US2009/048935 dated Jan. 5, 2011 (4 pages).

Written Opinion of the International Searching Authority in PCT/US2009/048935 dated Feb. 9, 2010 (3 pages).

International Search Report in PCT/US2009/048935 dated Feb. 9, 2010 (3 pages).

International Preliminary Report on Patentability in PCT/US2012/038188 dated Nov. 19, 2013 (6 pages).

Written Opinion of the International Searching Authority in PCT/US2012/038188 dated Jan. 22, 2013 (5 pages).

International Search Report in PCT/US2012/038188 dated Jan. 22, 2013 (3 pages).

Notice of Allowance in U.S. Appl. No. 13/800,462 dated May 28, 2014 (9 pages).

B. Galvin, et al., Recovering Motion Fields: An Evaluation of Eight Optical Flow Algorithms, Proc. of the British Machine Vision Conf. (1998).

J. R. Bergen, et al., Hierarchical Model-Based Motion Estimation, European Conf. on Computer Vision (1993).

K. Nishino, et al., The World in an Eye, IEEE Conf. on Pattern Recognition, vol. 1, at pp. 444-451 (Jun. 2004).

R. Kumar, et al., Direct recovery of shape from multiple views: a parallax based approach, 12th IAPR Int'l Conf. on Pattern Recognition.

R. P. Wildes, Iris Recognition: An Emerging Biometric Technology, Proc. IEEE 85(9) at pp. 1348-1363 (Sep. 1997).

* cited by examiner

METHOD OF REDUCING VISIBILITY OF PULSED ILLUMINATION WHILE ACQUIRING HIGH QUALITY IMAGERY

RELATED APPLICATIONS

This application is a continuation of International Application No. PCT/US09/04835, which claims priority to i) U.S. Provisional Patent Application No. 61/075,817 filed Jun. 26, 2008; and ii) U.S. Provisional Patent Application No. 61/185,417 filed Jun. 9, 2009; and the entire teachings of the aforementioned U.S. provisional patent applications i)-ii) are hereby incorporated by reference herein.

BACKGROUND OF THE INVENTION

Field of the Invention

The invention relates to biometry, the study of characteristics of people for identification purposes. More specifically, the invention relates to active illumination used during biometry, especially iris and facial recognition, for enhancing user experience while maintaining image quality.

Description of the Related Art

Active illumination has been widely used in the field of iris recognition, which is the field of recognizing individuals based on the patterns of the iris in the human eye. For example, Daugman describes a range of iris recognition deployments all using active infrared illumination [J. Daugman/"The Importance of being Random: Statistical Principles of iris Recognition"/Pattern Recognition 26 (2003) 279-291]. A problem however is that the illumination is often noticed by the subject, which may cause them some temporary discomfort while using the system.

Moreover, FIG. 1 shows methods for iris recognition using pulsed lighting 11 synchronized to frame acquisition 10 that has been described in US 2003/0169334 A1 and U.S. Pat. No. 7,542,628, for example, as a means to stop the motion of an individual while performing iris recognition. The top graph on the horizontal axis shows time, and on the vertical axis it is shown whether a frame is being acquired or not. In this example three frames of a continuous sequence are shown being acquired, with each frame being acquired in a finite time period T.

The illumination in these systems is more noticeable to the user due to the repetitive on/off cycle of the illumination. Pulsed Light Emitting Diode (LED) lighting compared to constant LED lighting is preferable in these applications since for a given average heat dissipation capability of an LED, more power can be concentrated in the pulse during which the frame is being acquired, resulting in higher quality imagery with a lower signal to noise ratio, rather than wasting the power during the time period when the image is not being acquired.

In addition, as iris recognition devices have becomes smaller, a side effect is that the user is more likely to look directly at or near the light sources mounted within a compact case. As such, the impact of the illumination is perceptually much greater than if the illumination were placed elsewhere. Put simply, the illuminators are more noticeable to the user, even though the incident power to the eye is the same compared to when the illuminators are placed elsewhere.

Of equal importance, the power of Light Emitting Diode (LED) illumination has increased substantially in recent years so that the LEDs are that much more noticeable to the user even though the incident power is the same, compared to less powerful LEDs spread over a larger area. High power LEDs can now be pulsed at $>=250$ mA. We have found that the use of pulsed illumination combined with the two factors above vastly increases the user's perception of the illumination. This very high perception of the illumination even given safe illumination intensity level can not only be annoying to a user, it can also create photosensitive epilepsy in certain subjects.

Wilkins in "Visual Stress", Oxford Univ Press, 1995 describes how the peak response for photosensitive epilepsy is approximately 15 Hz, and the wavelength of light to which patients are most sensitive is in the red wavelength region, which is near the infra-red region used for iris recognition.

For all the aforementioned reasons therefore, it is important to reduce the visibility of illumination to the subject, while not impacting the quality of imagery acquired. This is a difficult problem since changing the characteristics of the illumination can potentially adversely impact the characteristics of the images being acquired.

SUMMARY

In light of these and other problems, we have devised a method of illuminating the subject and acquiring imagery for use in applications such as iris or facial recognition that that exploits differences between the characteristics of the imaging system and the characteristics of the human eye in order to maximize the quality of the images being acquired while minimizing the illumination being perceived by the user. We use four differences in the characteristics of the imaging system and the human eye: temporal persistence of the human visual system, background light level, spectral response, and asymmetric perceived pulse brightness. These methods can be used individually or collectively, depending on the constraints and specifications of the particular device.

The invention is a method of providing active illumination during biometry that utilizes pulsed lighting synchronized to the frame acquisition of an imaging system. The inventive method includes the steps of a) providing a first illumination modality that maximizes the quality of images captured by the imaging system; and b) providing a second illumination modality, substantially simultaneously as the first illumination modality, that, in combination with the first illumination modality, minimizes the overall illumination perceived by the user.

In one aspect, the first illumination modality is provided as a first set of periodic illumination pulses synchronized with the frame acquisition of an imaging system, and the second illumination modality is provided as a second set of periodic illumination pulses not synchronized with imaging system frame acquisition. Preferably, the pulse rate frequency of a combination of the first and second sets of illumination pulses is greater than a response frequency for photosensitive epilepsy and is 2-10 times the pulse rate of the first set of pulses alone. More preferably, the intensity of the second set of pulses is equal to or greater than the intensity of the first set. The frame acquisition rate of the imaging system may be set to a maximum value.

In another aspect, the first illumination modality is provided a first set of periodic illumination pulses, and the second illumination modality is provided as constant background illumination. The background illumination of the second modality is preferably in the range of from at least 0.02 times, up to but not equal to, the average illumination of the pulses of the first illumination modality. Optionally, the first and second modalities may be both provided by the same single illumination source, or they may each be provided by different illumination sources. Optionally, the wavelength of the light from the first illumination source is different from the wavelength of the light of the second illumination source. In this case, the first wavelength is substantially in the range of 700-900 nm and the second wavelength is substantially in the range of 400-700 nm. In addition or in the alternative, the intensity of the light from the second illumination source is substantially 0.1-10 times the intensity of the light from the first illumination source.

In another aspect of the invention, the first illumination modality is provided by a first illumination source that generates a first set of periodic illumination pulses, and the second illumination modality is provided by a second illumination source to generate a second set of periodic illumination pulses having a substantially inverse waveform of the first set of pulses. As before, the wavelength of the light from the first illumination source may be different from the wavelength of the light of the second illumination source. Again, the first wavelength is preferably substantially in the range of 700-900 nm and the second wavelength is preferably substantially in the range of 400-700 nm.

In yet another aspect of the invention, the first modality includes pulses of a first duration and having a first intensity synchronized with imaging system frame acquisition, while the second modality includes pulses not synchronized with imaging system frame acquisition and have a shorter duration but equal or greater intensity than the pulses of the first modality. Preferably, the second pulses are 0.001 to 1 times the duration and 1 to 100 times the intensity of the first pulses.

In all cases, it is preferred to include in the method the steps of sensing the actual output of at least one of the first and second illumination modalities, and adjusting the output of at least one of the first and second illumination modalities in response to the output sensed in the sensing step. One example is to provide at least one photodiode for detecting the output of one or more modalities and to connect the photodiode to the controller(s) of the one or more illumination sources to provide feedback to the controller(s).

More generally, the invention is a method of providing active illumination during the acquisition of high quality images of a person that utilizes pulsed lighting synchronized to imaging system frame acquisition. A first illumination modality is provided that maximizes the quality of images captured by the imaging system. Substantially at the same time, a second illumination modality is provided that, in combination with the first illumination modality, minimizes the overall illumination perceived by the user.

The invention also includes an image capturing apparatus that performs the abovementioned methods.

DETAILED DESCRIPTION OF THE DRAWINGS AND THE INVENTION

Description of the invention will now be given with reference to FIGS. 1-13. It should be understood that these figures are exemplary in nature and in no way serve to limit the scope of the invention, which is defined by the claims appearing herein below.

Figure 1:
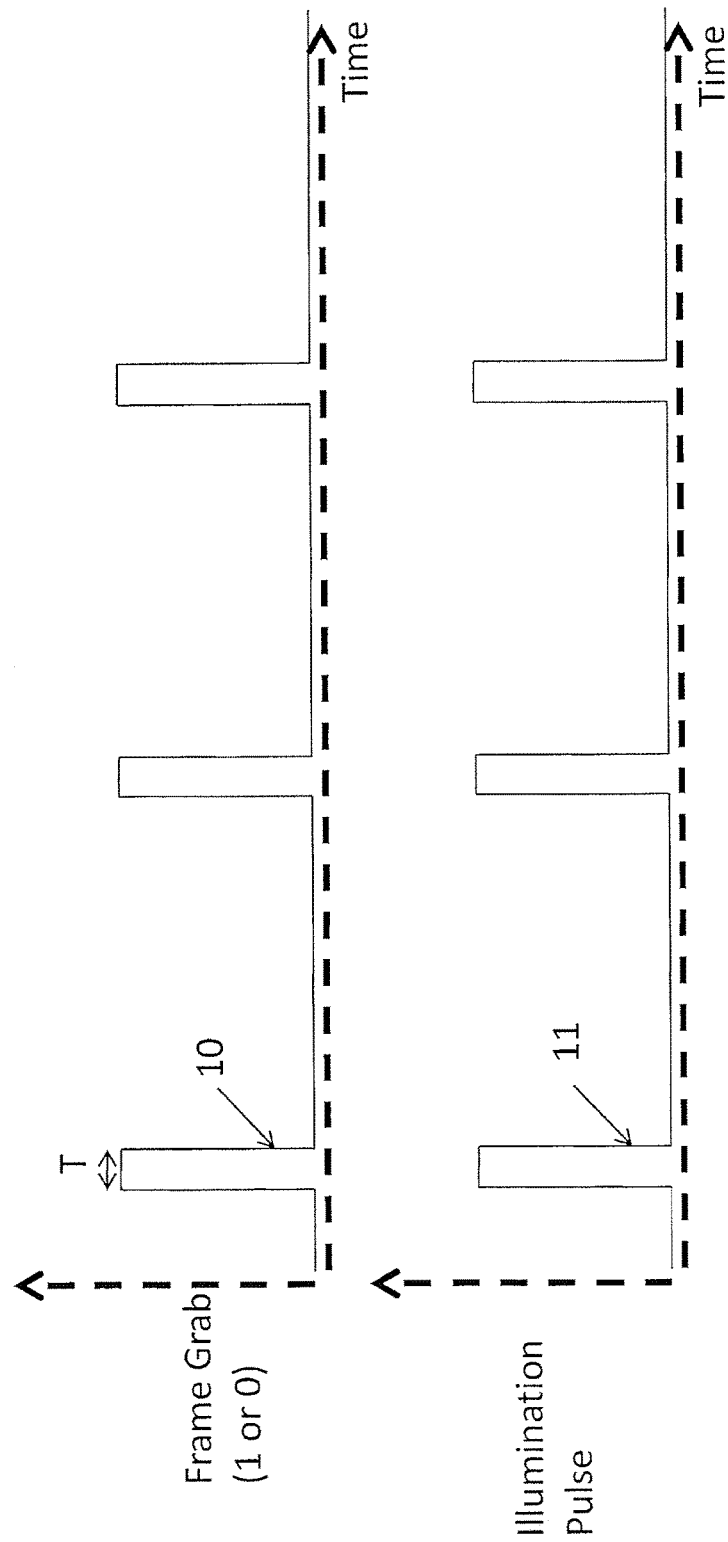
FIG. 1 shows, on the top, image frames being acquired at different time instants, and on the bottom, shows illumination pulses synchronized to the frame acquisition.
Figure 2:
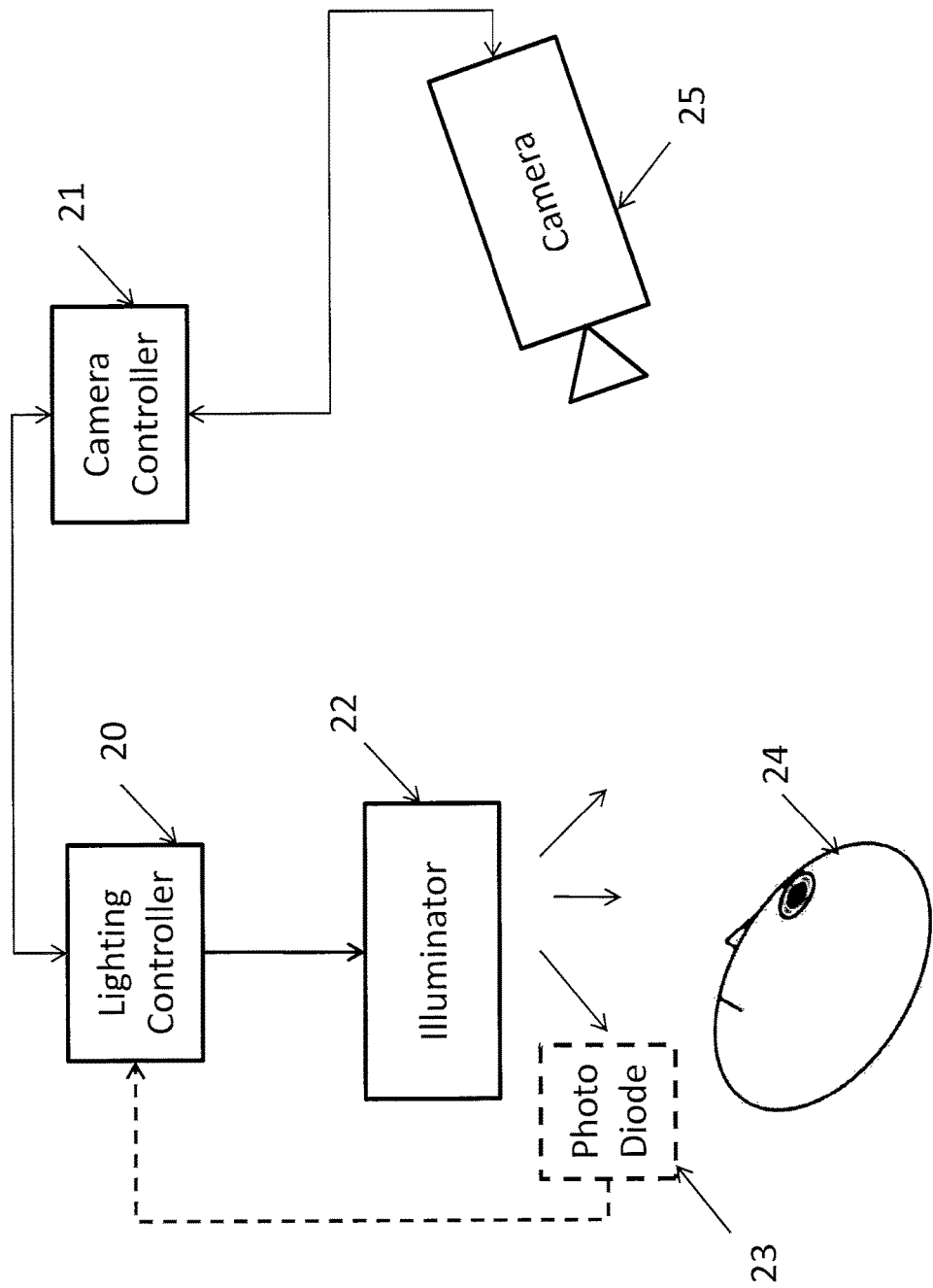
FIG. 2 shows a first system implementation of the invention, comprising an illuminator, a lighting controller, a camera controller, a camera, an optional photodiode, with the camera and illuminator positioned facing the direction of a subject.

In the first aspect of the invention, we take advantage of the temporal persistence of the human visual system, such that individual pulses at higher frequencies are less discernible than individual pulses at lower frequencies. FIG. 2 shows such a system implementation.

An illuminator 22 is controlled by a lighting controller 20, which is synchronized by a camera controller 21 to a camera 25 that acquires frames. An optional photodiode 23 can also be connected to the lighting controller 20. The illuminator 22 projects light onto the optional photodiode 23 as well as on the subject 24, shown on the bottom of the figure. The illumination is reflected off the eye of the subject 24, and an image of the eye is captured using the camera 25 shown to the right of the figure.

Most camera sensors are capable of acquiring data at 5-30 frames per second or higher, depending on the resolution of the imager. As the resolution of the imager increases, the number of pixels per image that needs to be acquired also increases, and therefore the rate at which data can be acquired through a given data bandwidth channel reduces. Iris recognition typically uses high resolution cameras (for example, 1.3 Mpixel or greater) and such cameras often have frame rates limited to 5-15 frames per second as a result. US 2003/0169334 A1 and U.S. Pat. No. 7,542,628 describe methods whereby the frame acquisition is synchronized to the illumination pulse. If the acquired frame rate and illumination pulse rate is set too low, then the performance of the iris recognition device can be impacted since not enough frames are being acquired in a sufficient time period for reliable acquisition of eye imagery of the subject. On the other hand, if the acquired frame rate and illumination pulse rate is set at the highest possible rate for the sensor, which may be close to 15 frames and illumination pulses per second, then the illumination pulse rate is close to the peak response for photosensitive epilepsy.

The first aspect of the invention overcomes this problem by using a different pulse rate for the illumination compared to the frame acquisition rate of the sensor, such that a portion of the illumination pulses are still synchronized with frame acquisition but where the remaining portion of illumination pulses is not. Put another way, a first set of pulses coincide with frame/image capture (the synchronized pulses), while a second set of pulses are triggered at other times (the asynchronous pulses). The pulse rate of the illumination is set sufficiently high in order to take advantage of the persistence of the human visual system so that the illumination pulses appear almost unnoticed to the subject, but a subset of the pulses are still synchronized to the lower frame acquisition rate so that illumination is provided at the lower frequency in order to provide high-quality, well-illuminated imagery. In this way, photosensitive epilepsy or discomfort to the user is not a concern, even though images are being illuminated and acquired at a rate to which the human eye is much more sensitive.

Figure 3:
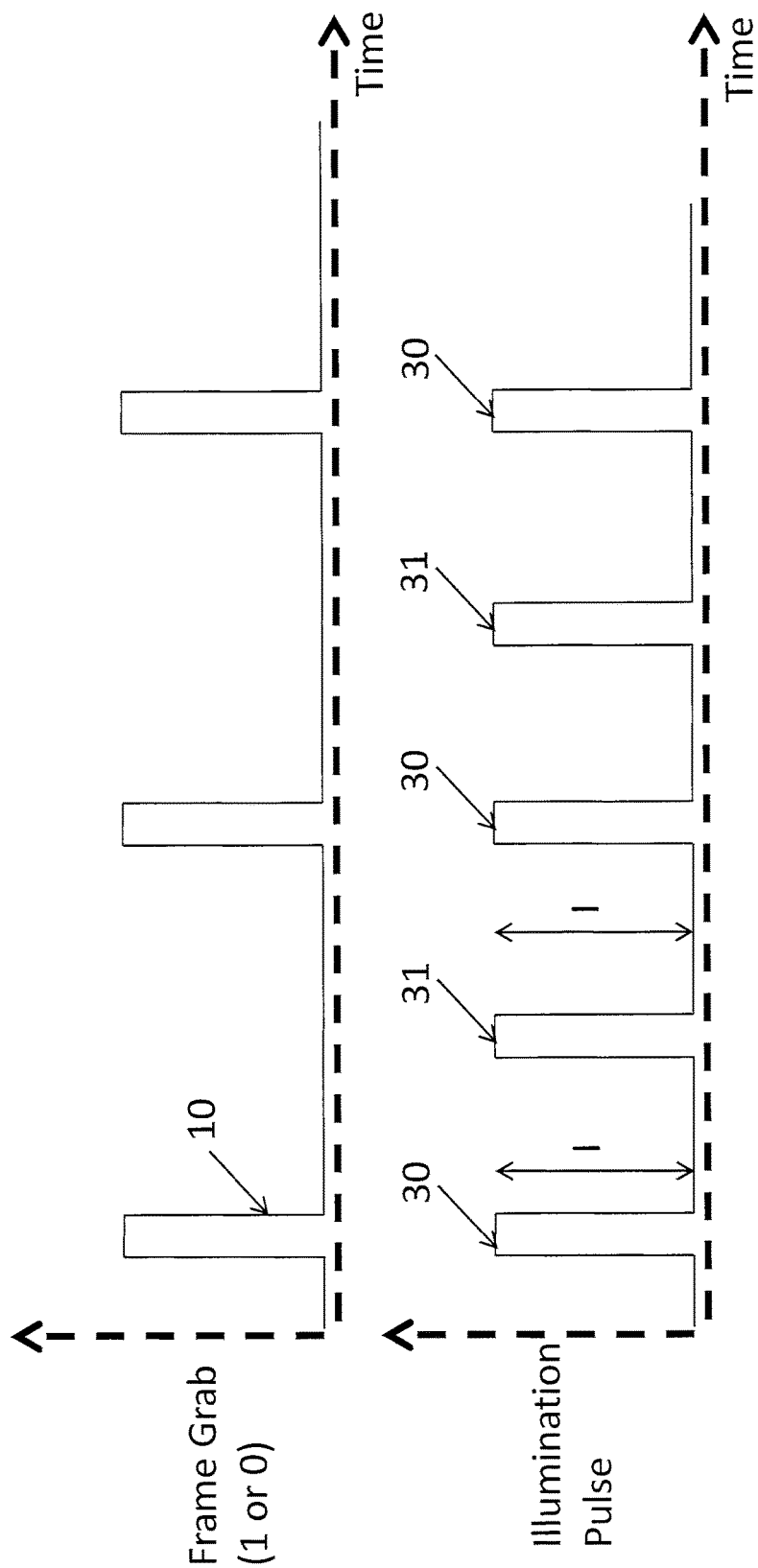
FIG. 3 shows, on the top, image frames being acquired at different time instants, and on the bottom, shows a first modality of illumination synchronized to the frame acquisition and a second modality of illumination not synchronized with the frame acquisition.

FIG. 3 shows an example of this method whereby frames are acquired as shown in 10, and whereby illumination is pulsed as shown in 30 and 31. The top graph shows time on the horizontal axis, and on the vertical axis shows by the value 1 that an image is being acquired during that time instant, and by the value 0 that imagery is not being acquired. The bottom graph shows time on the horizontal axis to the same scale as the first graph, and on the vertical axis shows the intensity of the illumination pulse. Note that the pulse rate of the illumination 30 in the bottom graph is different from the acquisition rate of the frames 10 in the top graph. A subset 30 of the illumination pulses are synchronized with the cameras in order to provide illumination during the time that the imagery is being acquired, but the remaining subset 31 of the illumination pulses occur between the times that images are acquired. By using this method, the pulse rate of the illumination is higher than the frame acquisition rate. For example, in the example shown in FIG. 3, if the frame acquisition rate is 15 frames per second, then the illumination pulse rate is 30 pulses per second. While an illumination pulse rate of 15 pulses per second is very noticeable and is at the peak response for photosensitive epilepsy, a pulse rate of 30 pulses per second is much less noticeable to a user.

Figure 4:
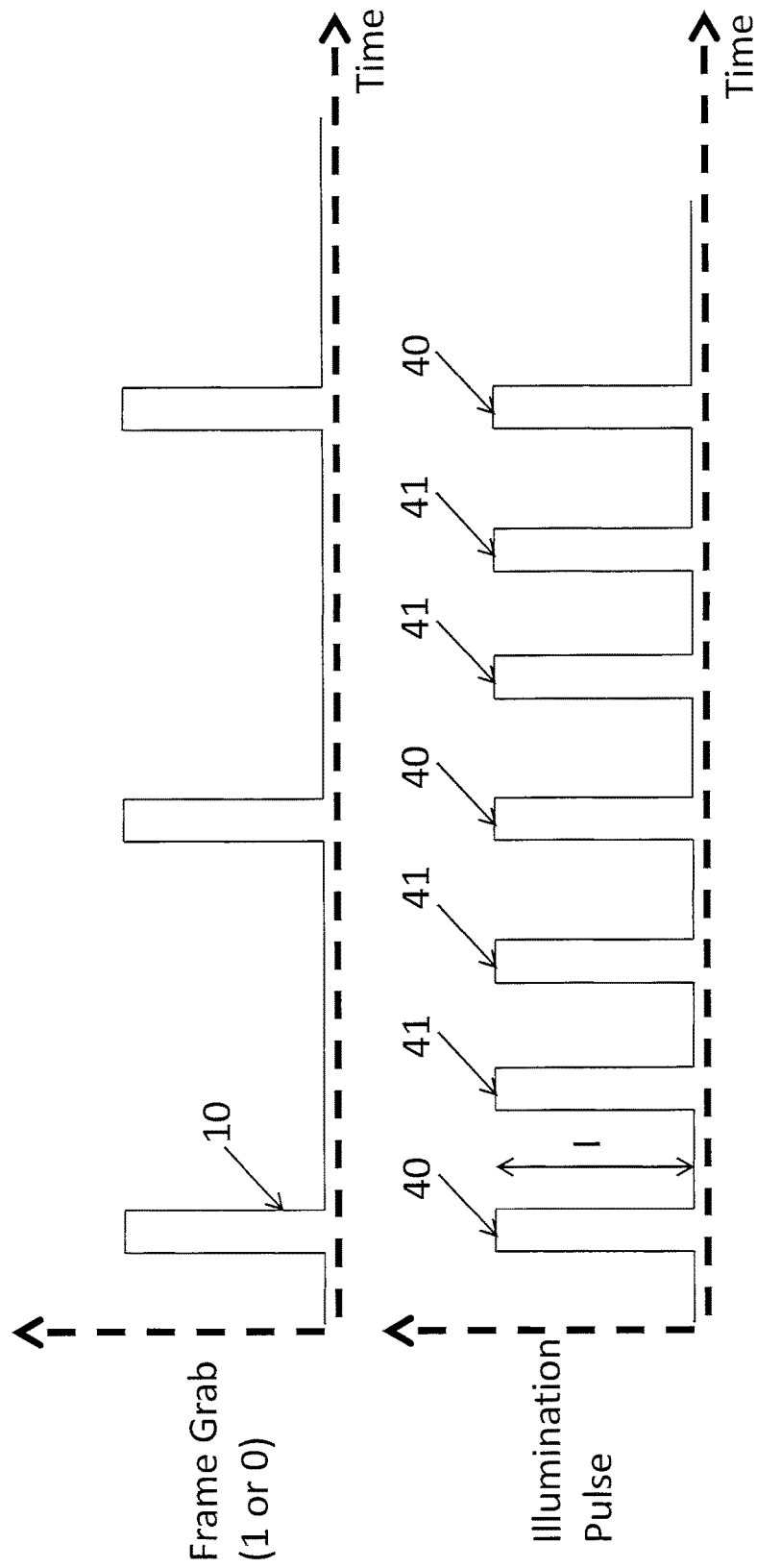
FIG. 4 shows, on the top, image frames being acquired at different time instants, and on the bottom, shows a first modality of illumination synchronized to the frame acquisition and a second modality of illumination not synchronized with the frame acquisition, whereby the combined frequency of the first and second modalities of illumination is ×3 the frequency of the frame acquisition.

As shown in FIG. 4, note that arbitrary illumination pulses 41 can be inserted between the illumination pulses 40 that are synchronized with the illumination, as shown in FIG. 4. In this case 2 pulses are inserted between the pulses that are synchronized with the frame acquisition, resulting in an illumination frequency that is ×3 the frequency of frame acquisition. A Fourier analysis of the pulse train can show the decomposition of the output illumination pulse rate. Due to the limited response time of the human visual system, illumination pulses at 30 Hz or higher are almost unnoticeable compared to pulses at 15 Hz or lower, much in the same way as flickering of the display on a television set or fluorescent lights are generally not noticed because the flicker occurs at 30 Hz or higher. A preferred pulse rate of the illumination is within the range of ×2 to ×10 the frame acquisition rate. By "pulse rate" it is understood to mean the primary frequency of the respective pulses, since the pulses are square waves (which decompose into multiple frequencies).

The asynchronous pulse sets 31 and 41 are shown to be evenly periodic, and that is preferred. However, the asynchronous pulses need not be evenly periodic; they can be spaced unevenly in time.

The intensity of the illumination between frame acquisition does not necessarily need to be smaller than the intensity of the illumination that is synchronized with frame acquisition, in order to achieve optimal imagery. In fact, we have found it advantageous to use the same or higher intensity illumination between frame acquisition compared to during frame acquisition, as described further in the fourth aspect of the invention.

In the second aspect of the invention, we take advantage of another property of the human visual system such that the sensitivity of the eye is substantially consistent with Weber's law whereby for a given wavelength of light the minimum brightness difference that can be perceived is approximately proportional to the average brightness being perceived. In other words, the brighter the scene, then the less sensitive the human visual system is to a fixed difference in illumination either temporally or spatially. We impose this constraint with our iris recognition system using 2 methods.

Figure 5:
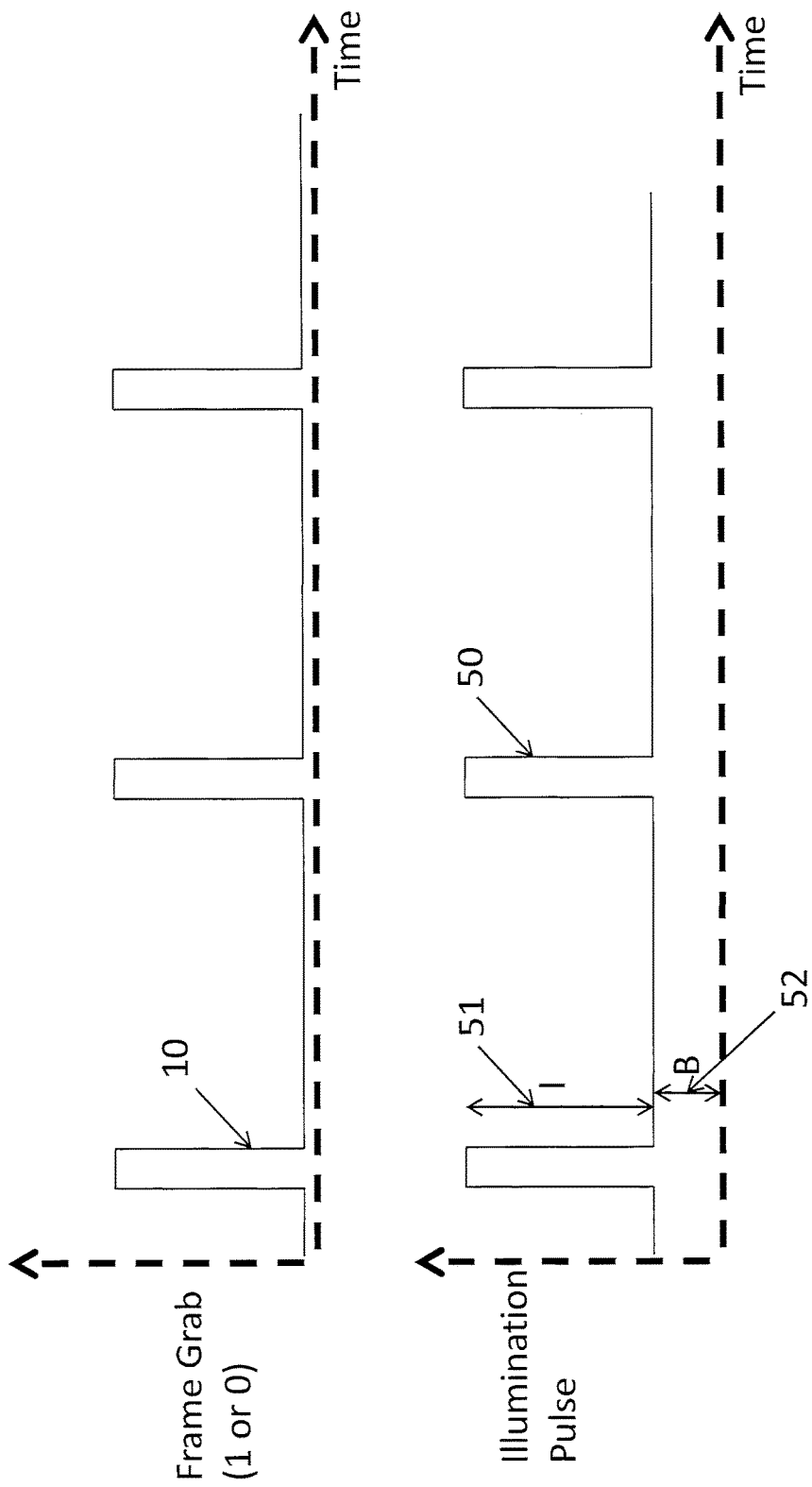
FIG. 5 shows, on the top, image frames being acquired at different time instants, and on the bottom, shows a first modality of illumination pulses synchronized to the frame acquisition and a second modality of illumination that provides substantially constant background illumination.

The first method of the second aspect of the invention is shown in FIG. 5. We use a single illumination source 22 that uses illumination pulses 50 of intensity I (51) that are synchronized to frame acquisition 10, but using the lighting controller 20 we also add a constant background illumination signal B (52) to the same illuminator 22 so that the brightness of the illumination is non-zero between the pulses. An injection of even a small background illumination can greatly reduce the perceived brightness of the illumination pulse to the human visual system. Put simply, illumination is much more noticeable when pulsed in complete darkness compared to being pulsed with a background of even small, constant illumination. A preferred intensity of background illumination B (52) is in the range of from approximately 0.05 up to but not including 1 times the intensity peak I (51) of the pulsed illumination.

Figure 6:
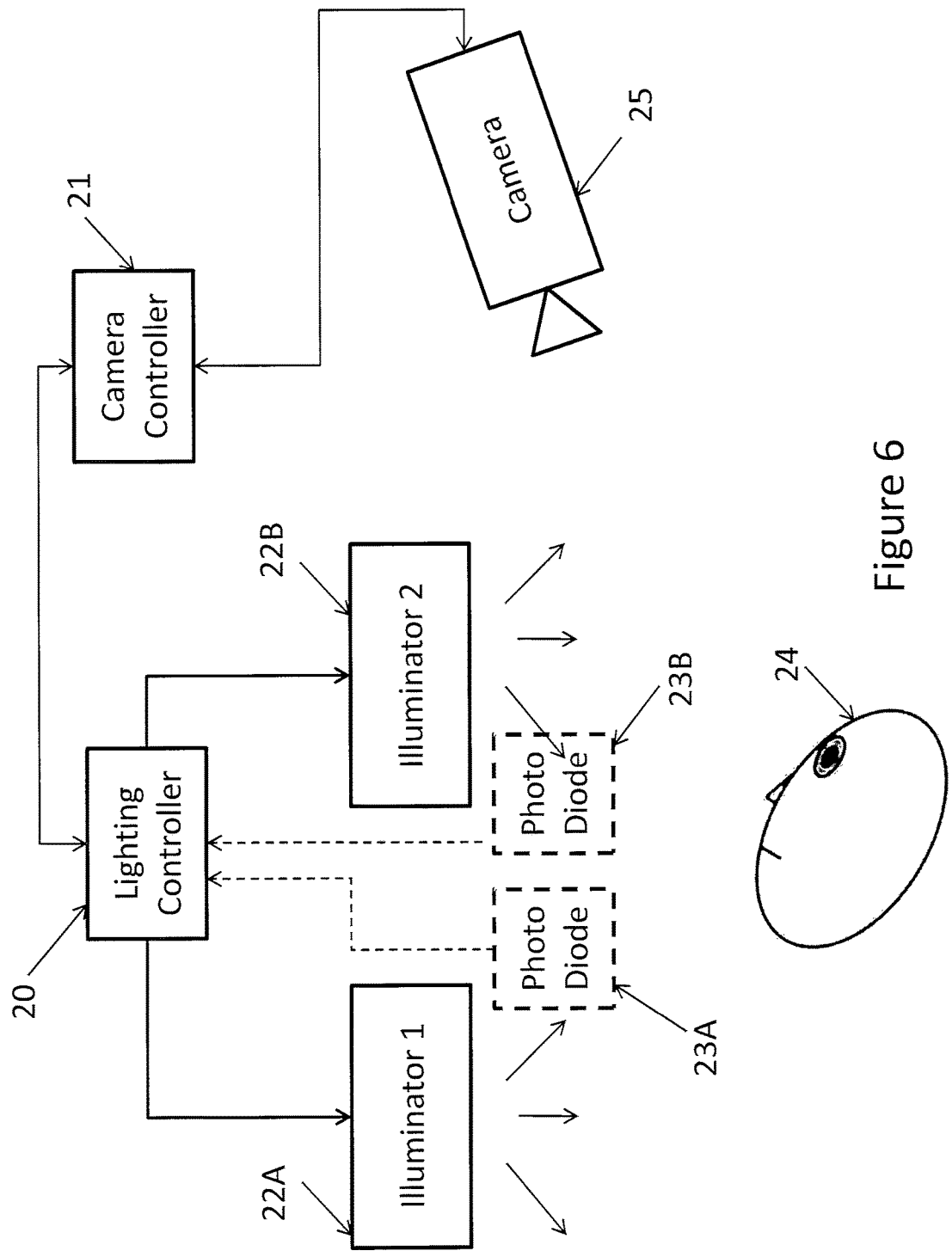
FIG. 6 shows a second system implementation of the invention, comprising two illuminators, a lighting controller, a camera controller, a camera, two optional photodiodes, with the camera and illuminators positioned facing the direction of a subject.

The second method of the second aspect of the invention is shown in FIG. 6, which is the same system shown in FIG.

Figure 7:
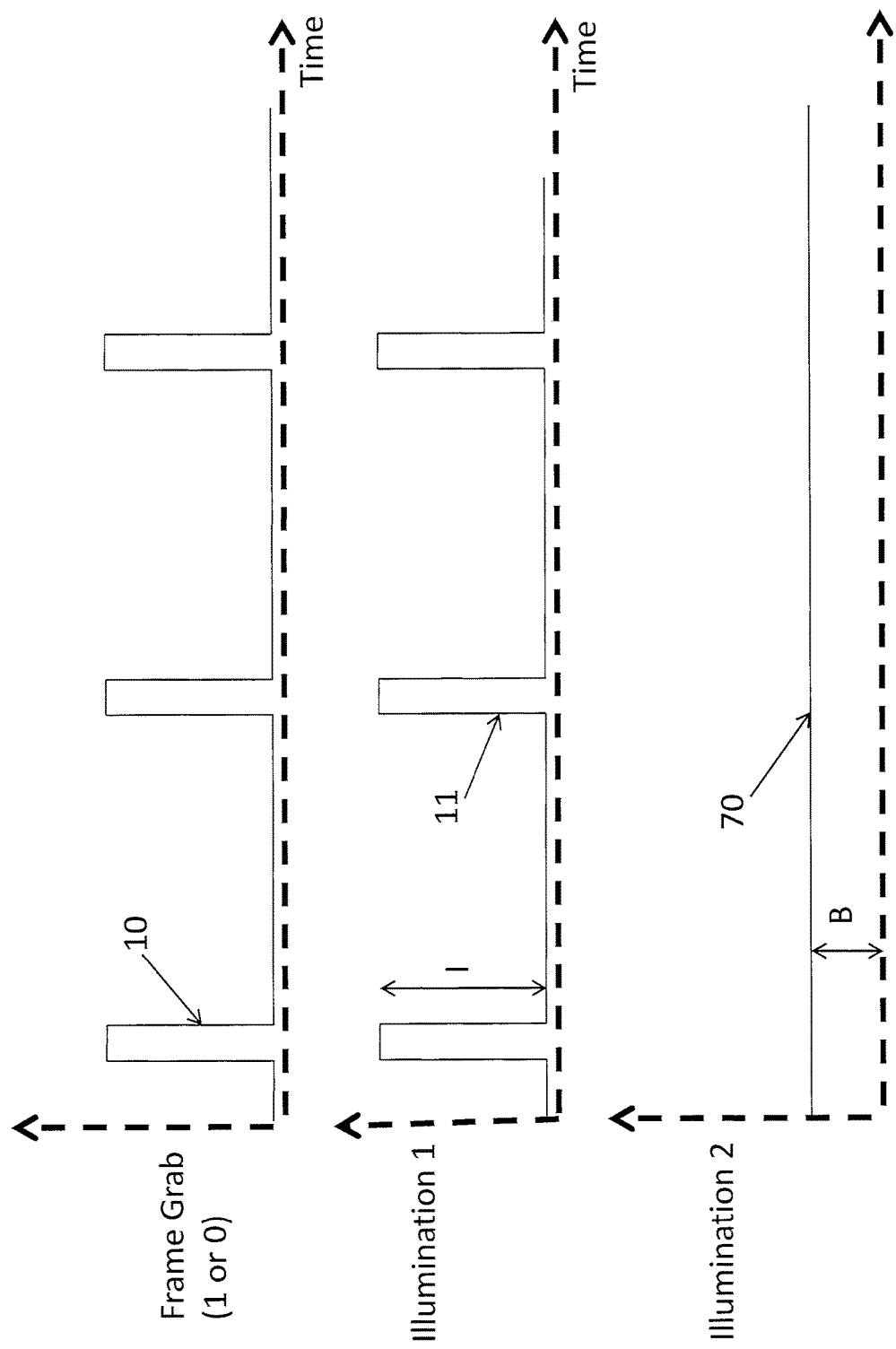
FIG. 7 shows, on the top, image frames being acquired at different time instants, in the middle shows a first modality of illumination pulses synchronized to the frame acquisition being provided by a first illuminator, and on the bottom, shows a second modality of illumination comprising substantially constant background illumination being provided by a second illuminator.
Figure 8:
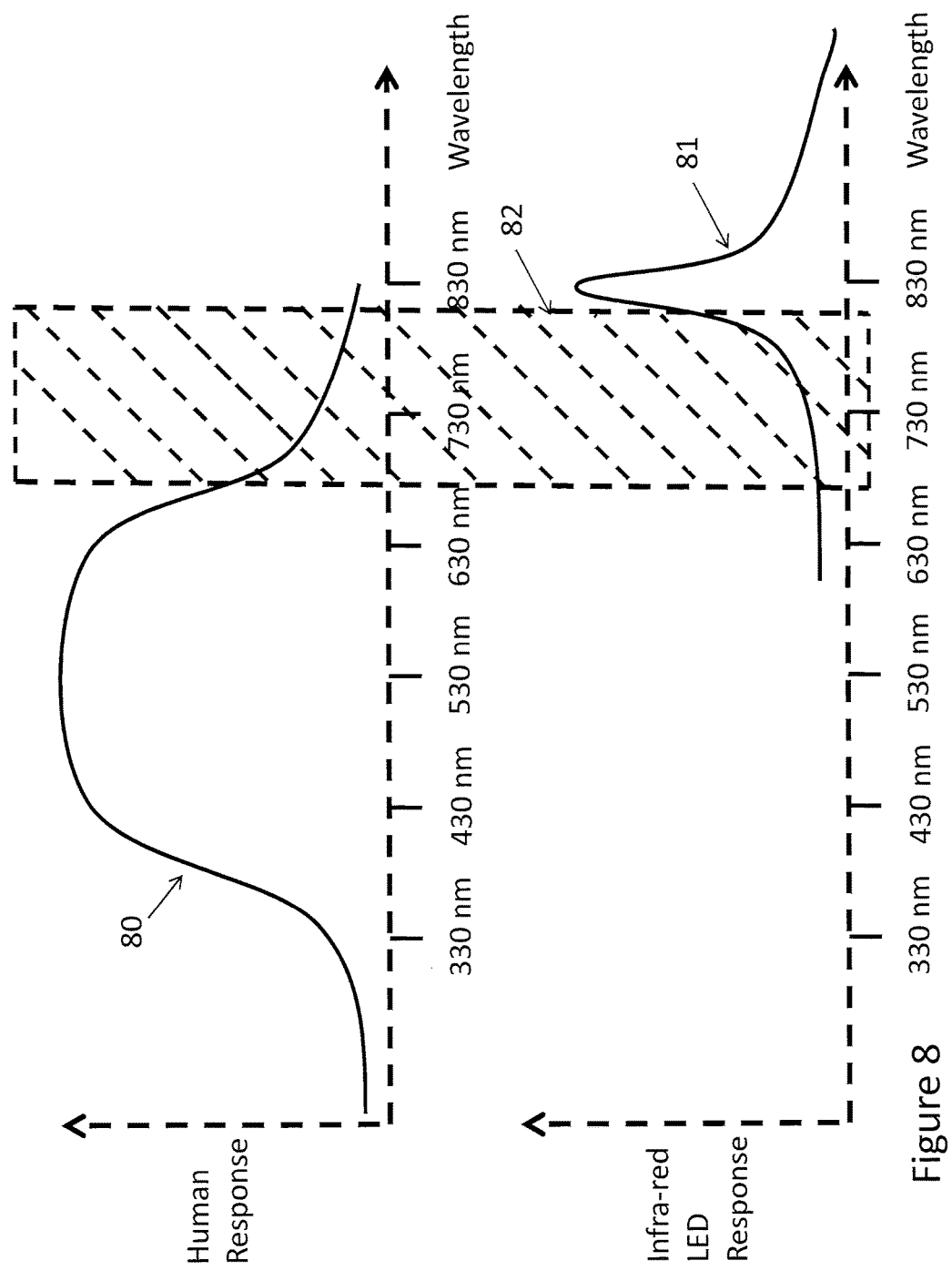
FIG. 8 shows, on the top, the spectral sensitivity of the human eye, on the bottom shows the spectrum of an infrared LED source, and in the diagonally-marked area shows the overlap between these two spectrums.
Figure 9:
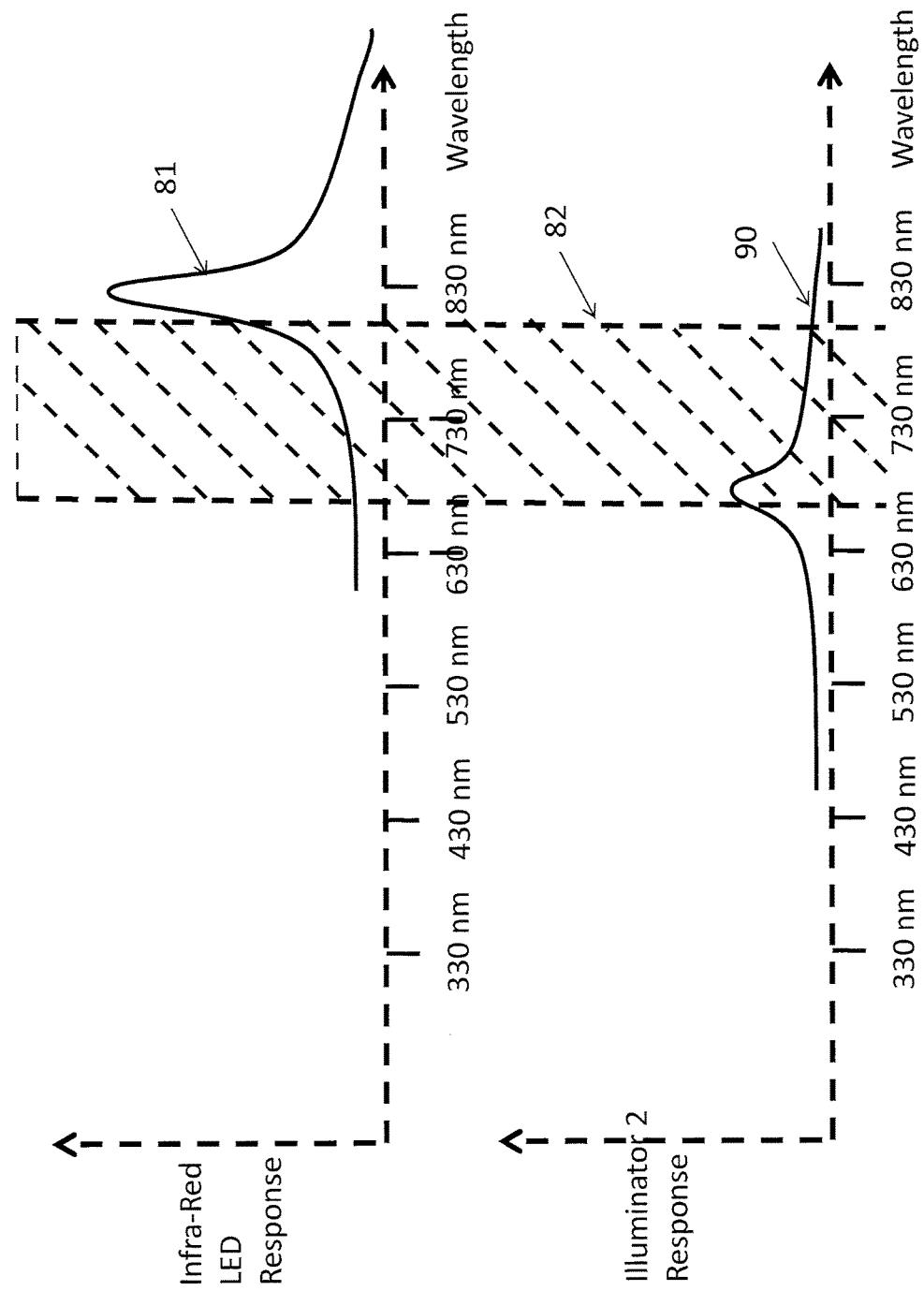
FIG. 9 shows on the top, shows the spectrum of an infra-red LED source, on the bottom shows the spectrum of a second LED source, and in the diagonally-marked area shows the overlap between these two spectrums.

1 except the lighting controller 20 is now controlling 2 illumination sources, 22A and 22B. As shown in FIGS. 6 and 7, we use one illumination source 22A synchronized to frame acquisition 10 for illuminating the eye 24 using pulsed illumination 11, and a second illumination source 22B in order to provide the background illumination. The advantage of using 2 illumination sources instead of 1 is that more power can be projected to the user 24 since more illuminators are available, and also the illuminators can optionally be of different wavelengths, which has some advantages. For example, the preferred wavelength range of the first illumination source 22A for illuminating the eye for iris recognition is substantially 700-900 nm which lies in the near infra-red spectrum. As described below a first preferred wavelength range of the second illumination 22B is within 400-700 nm which lies in the spectrum to which humans are sensitive, with a second preferred wavelength range being near 660 nm or in the spectrum that appears red to a human observer. FIG. 8 on the top shows the spectral sensitivity 80 of the human eye, showing the strong response in the 400-700 nm wavelength range. FIG. 8 on the bottom shows an example of the spectrum 81 of an infra-red LED which in this case is centered about 830 nm. While most of the infra-red illumination is invisible to the human eye, a portion of the illumination is visible as shown by the intersection 82 of the human response curve with the illumination response curve, shown by the diagonally-marked area in FIG. 8. This illumination appears red to the human eye. FIG. 9 on the top shows the same spectrum 81 of the infra-red illuminator as shown in FIG. 8, but on the bottom shows the spectrum 90 of a second illuminator that in this case peaks in the region of 660 nm, which also appears substantially red to the human eye. By projecting substantially red background illumination from the second illuminator of a similar color to the residual visible illumination from the infra-red illuminator, color differences are minimized and the infra-red illuminator becomes almost unnoticeable to a human observer. Notwithstanding this, a benefit is still achieved even if the second illuminator has a different color compared to the infra-red illuminator.

A preferred intensity of the second illuminator source is in the range of 0.1 to 10 of the peak intensity of the infra-red pulsed illumination.

Figure 10:
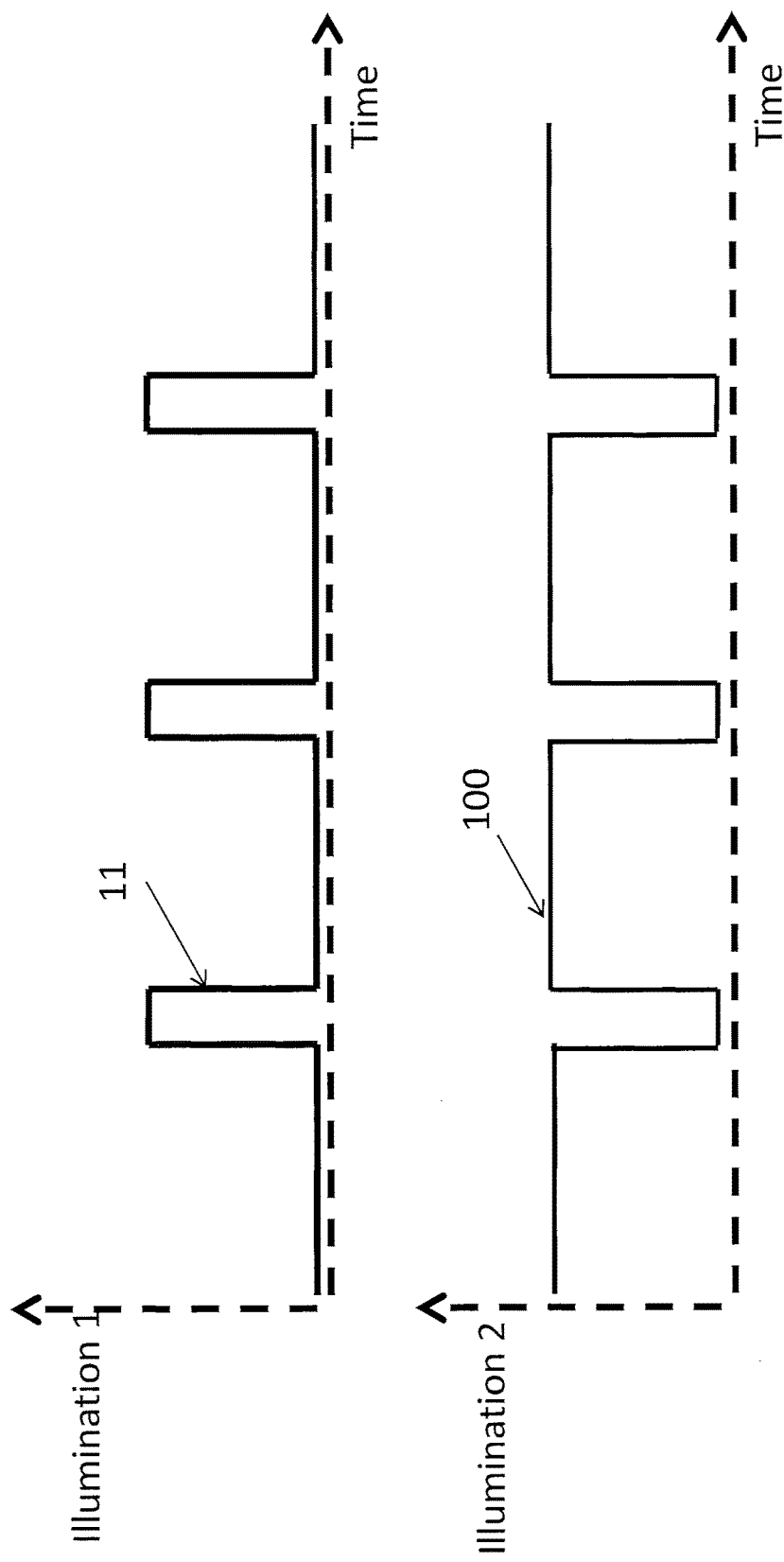
FIG. 10 shows on the top a first modality of illumination, and on the bottom shows a second modality of illumination that is substantially the inverse of the first modality of illumination

In the third aspect of the invention, we again take advantage of the differences in the spectral response of the visual system compared to the spectral response of the camera system. Similarly to the method described above, in this embodiment of the invention we also introduce a second illumination module with wavelength characteristics that are substantially different from the wavelength characteristics of the first illumination module. In this case however, as shown in FIG. 10, we control each illumination module such that, at least for the most part, while one module (11) is illuminated, the other (100) is not, and vice versa; i.e., that illumination of one module has substantially the inverse waveform of the other module. Preferably, the two modules have precisely inverse waveforms, however as frequency increases, it rises above the threshold at which the human eye can detect a difference. For example, a waveform at 100 Hz and a waveform at 200 Hz are different, but to the human eye, they may look the same, since the eye cannot respond that quickly.

The wavelength spectrums of the first and second illuminators are also chosen such that the spectrum defined by the intersection 82 of the human-visible spectrum and the spectrum of the first illuminator, and the spectrum defined by the intersection of the human visible spectrum and the spectrum of the second illuminator are substantially the same, as described earlier and shown in FIGS. 8 & 9. The eye perceives substantially non time varying illumination since the addition of the two signals in the two wavelength spectrums from the two illuminators results in substantially uniform perceived illumination both in terms of intensity and color. On the other hand, the camera perceives substantially pulsed illumination from the signal primarily from the first wavelength spectrum band.

Figure 11:
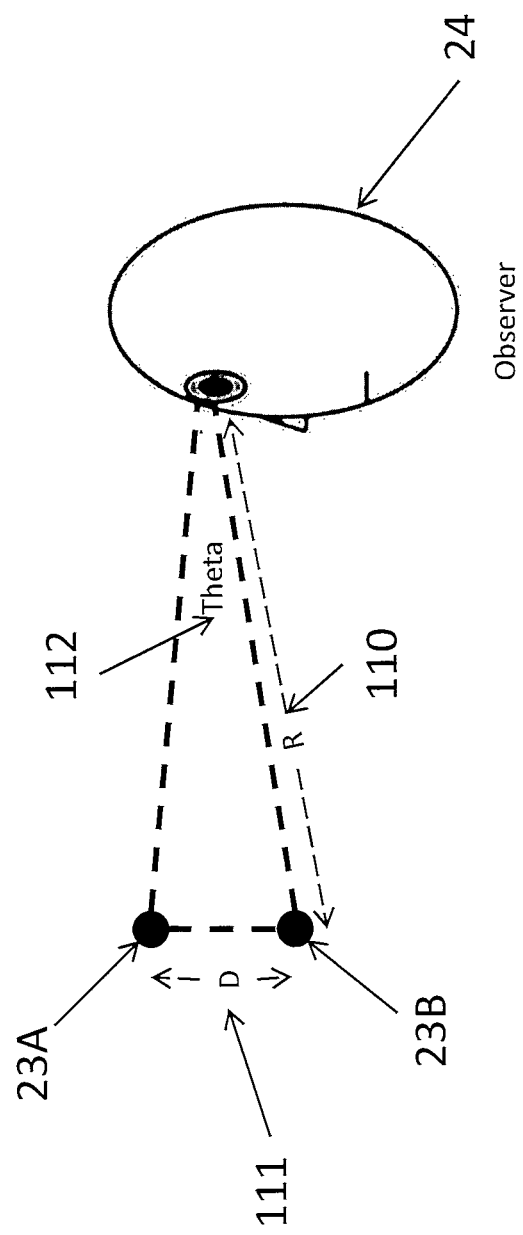
FIG. 11 shows a first illuminator separated from a second illuminator by a distance D, such that the illuminators are positioned substantially facing a user at a distance R.

While reducing or eliminating the magnitude of visible pulsed illumination observed by the subject substantially reduces discomfort, if the two or more illuminators are positioned substantially apart from each other, then spatial flickering may still be observed solely from the difference in position, even if the wavelength spectrum of each illuminator were identical. FIG. 11 shows the two illuminators 22A and 22B separated by distance D (111) and observed at a viewing radius R (110) and at an angle Theta (112) with respect to the user. Angular sensitivity of the human visual system is essentially in two parts: (i) peripheral angular sensitivity and (ii) foveal angular sensitivity. The peripheral angular sensitivity or human ability to discern an object viewed in the periphery begins to reduce dramatically at approximately 1 line/pairs per ⅓ degree (approximately 0.006 Radians). Foveal angular sensitivity or ability to discern an object in the fovea begins to reduce dramatically at approximately 1 line/pairs per 1/30 degree (approximately 0.0006 Radians). From geometry, for small values of Theta, the separation of the first and second illuminators is given by D=R*Theta, where Theta is in Radians and R is the distance of the user from the illuminators. The arrangement of the illumination may be such that the fovea of the eye is directly facing the illumination, or the illumination be offset such that it is facing the periphery of the eye. In one preferred embodiment therefore, it is preferred that the maximum separation of the first and second illuminators is governed by D=R*0.0006. In an exemplary system, R may range from 0.5 to 2 m, which results in maximum separation range for D to range from 0.3 mm to 1.2 mm. In another preferred embodiment, it is preferred that the maximum separation is governed by D=R*0.006. In a second exemplary system, R may range from 0.5 to 2 m, which results in maximum separation range for D to range from 3 mm to 12 mm.

In the fourth aspect of the invention, we take advantage of another property of the human visual system such that the perceived temporal response of the eye is non-symmetric for illumination that transitions from off-to-on, compared to light that transitions from on-to-off. More specifically, the perceived response time of the eye has a decay time that is longer than the attack time. For example, a description of this property of the eye is given by Jinno et. al "Effective Illuminance Improvement of a Light Source by using Pulse Modulation and Its Physcophysical Effect on the Human Eye" in J. Light & Vis. Env. Vol. 32, No. 2, 2008.

Figure 12:
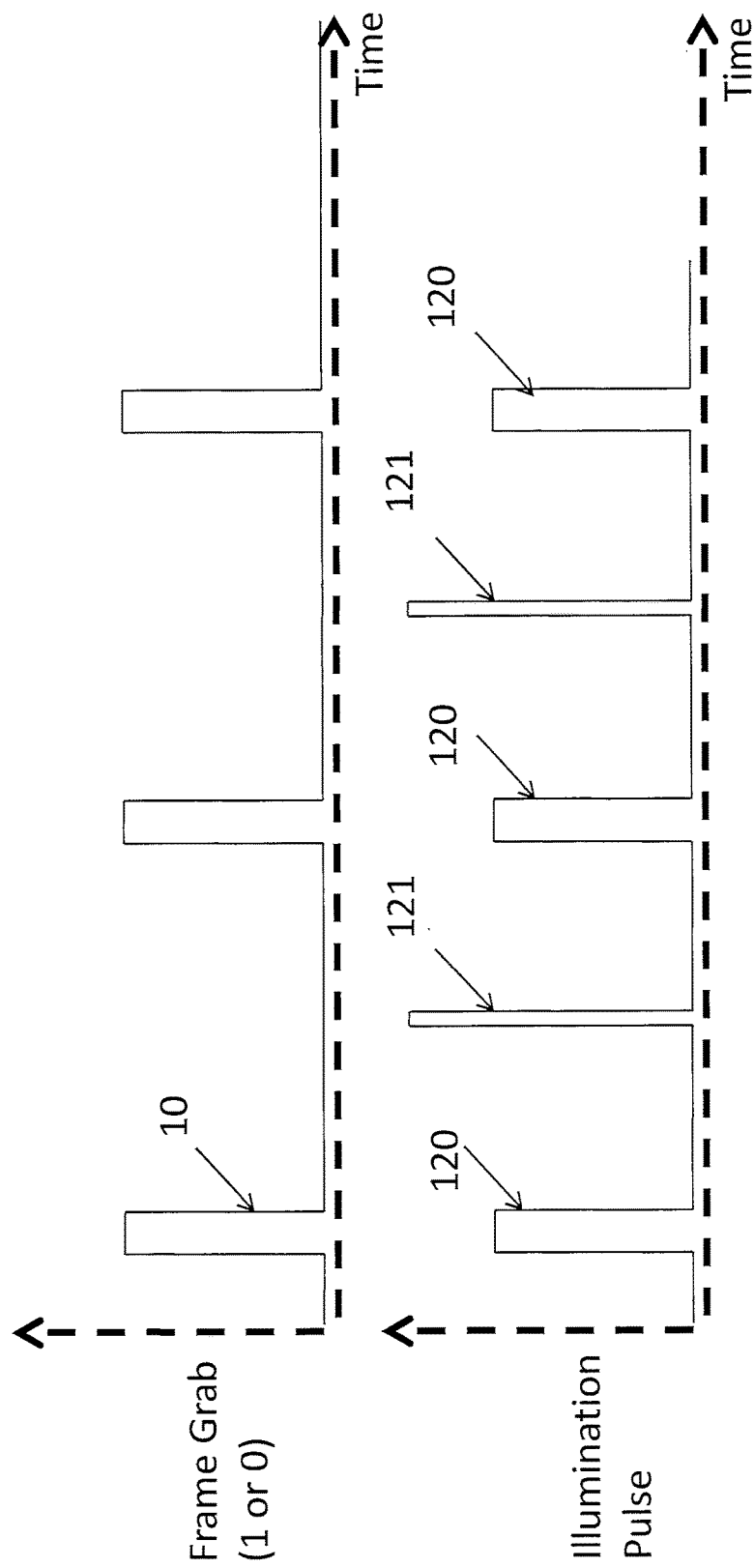
FIG. 12 shows, on the top, image frames being acquired at different time instants, and on the bottom, shows a first modality of illumination synchronized to the frame acquisition and a second modality of illumination not synchronized with the frame acquisition such that the intensity of the second modality is greater than or equal to the intensity of the first modality.
Figure 13:
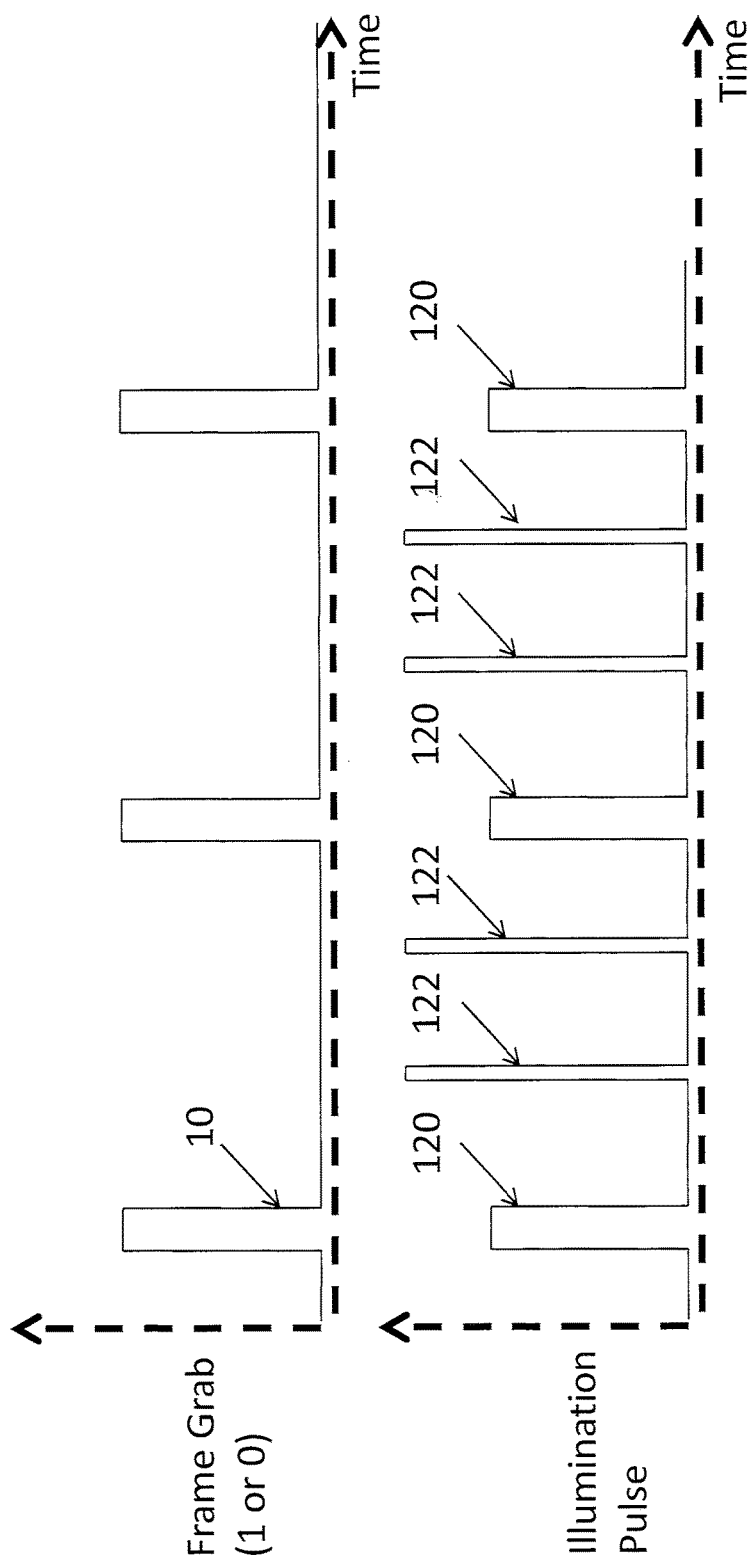
FIG. 13 shows, on the top, image frames being acquired at different time instants, and on the bottom, shows a first modality of illumination synchronized to the frame acquisition and a second modality of illumination not synchronized with the frame acquisition such that the intensity of the second modality is greater than or equal to the intensity of the first modality, and whereby the combined frequency of the first and second modalities of illumination is ×3 the frequency of the frame acquisition.

As shown in FIG. 12, we take advantage of this by modifying the pulse intensities and pulse widths such that the pulses 121 that occur in between pulses 120 that are synchronized with the frame acquisition 10 have lower pulse widths but the same or higher intensities compared to the intensities and widths of the pulses 120 that are synchronized with the frame acquisition. The human eye perceives the very bright but short pulse, and perceives that the very short pulse lasts longer than it actually does. The advantage is that with only a very small amount of power applied to the LEDs between the pulses that are synchronized with frame acquisition, the user will perceive bright illumination. The less power that is applied to the pulses 121 between the pulses 120 that are synchronized to the frame acquisition 10, then the more power that can be applied to the pulses 120 applied during frame acquisition for a given heat dissipation level of the LEDs. A preferred pulse rate of the illumination is within the range of ×2 to ×10 the frame acquisition rate. A preferred ratio of the width of the pulses that are synchronized to the frame acquisition compared to the width of the other pulses is within the range of 1 to 1000. A preferred ratio of the intensity of the pulses that are synchronized to the frame acquisition compared to the intensity of the other pulses is within the range of 0.1 to 1. As shown in FIG. 13, multiple pulses 122 can be introduced to occur in between pulses 120.

As described in the four aspects of the invention above, the characteristics of the illumination control signals (for example pulse width) are adjusted substantially within the preferred ranges to reduce or eliminate perceived flicker while maintaining high quality image acquisition. As shown in FIGS. 2 and 6, in an additional optional embodiment, one or more photodiodes 23, and 23A, 23B monitor the illumination being presented by the one or more illuminators 22, and 22A,22B, in any of aspects of the inventions described above. The brightness and spectral properties of some illuminators change over time, and this method allows residual flicker from such changes to be minimized. A preferred embodiment is such that the photodiode(s) has a response curve similar to the spectral response of the human visual system. In this way, controlling the illuminators such that the flicker output from the photodiode(s) is minimized is substantially equivalent to minimizing the flicker observed by a user.

Having described certain embodiments of the invention, it should be understood that the invention is not limited to the above description or the attached exemplary drawings. Rather, the scope of the invention is defined by the claims appearing herein below and any equivalents thereof as would be appreciated by one of ordinary skill in the art.

What is claimed is:

1. A method of providing active illumination during biometry:
   a) providing, to an eye whose iris biometrics are being acquired by a plurality of image frame acquisitions as uniquely-identifiable biometric data for biometric matching, a first illumination modality that includes a first plurality of infra-red illumination pulses each synchronized with a corresponding one of the plurality of image frame acquisitions during an acquisition period for acquiring the iris biometrics as uniquely-identifiable biometric data for biometric matching;
   b) providing, during the acquisition period to the eye whose iris biometrics are being acquired, a second illumination modality that includes a second plurality of infra-red illumination pulses being distributed unevenly between the first plurality of infra-red illumination pulses during the acquisition period for acquiring the iris biometrics as uniquely-identifiable biometric data for biometric matching, each of the second plurality of infra-red illumination pulses occurring at a different time instant from any image frame acquisition; and
   adjusting an output of at least one of the first illumination modality or the second illumination modality to avoid photosensitive epilepsy or to reduce flicker to an observer,
   wherein the distribution of the second plurality of illumination pulses varies between pairs of the first plurality of illumination pulses, and a difference in intensity observed by the observer between the first illumination modality and second illumination modality is minimized.

2. The method of claim 1, wherein a frequency of a combination of the first plurality of infra-red illumination pulses and the second plurality of infra-red illumination pulses is greater than a response frequency for photosensitive epilepsy.

3. The method of claim 1, wherein a pulse rate of a combination of the first plurality of infra-red illumination pulses and the second plurality of infra-red illumination pulses falls substantially within the range of 2-10 times a pulse rate of the first plurality of illumination pulses.

4. The method of claim 1, wherein an intensity of the second plurality of infra-red illumination pulses is equal to or greater than an intensity of the first plurality of infra-red illumination pulses.

5. The method of claim 1, further comprising:
   providing a third illumination modality including a constant background illumination during the acquisition period.

6. The method of claim 5, wherein an intensity of the constant background illumination of the third modality is in the range of from at least 0.02 times, up to but not equal to, the average intensity of the first plurality of illumination pulses.

7. The method of claim 1, wherein the first illumination modality and the second illumination modality are provided by a same single illumination source.

8. The method of claim 1, wherein the first illumination modality is provided by a first illumination source and the second illumination modality is provided by a second illumination source.

9. The method of claim 8, wherein a wavelength of light from the first illumination source is different from a wavelength of light of the second illumination source.

10. The method of claim 9, wherein the wavelength of light from the first illumination source is substantially in the range of 700-900 nm.

11. The method of claim 8, wherein an intensity of the light from the second illumination source is substantially 0.1-10 times an intensity of the light from the first illumination source.

12. The method of claim 1, wherein:
   each pulse from the first plurality of infra-red illumination pulses has a first pulse width and a first intensity;
   each pulse from the second plurality of infra-red illumination pulses has a second pulse width narrower than the first pulse width and a second intensity equal to or greater than the first intensity.

13. The method of claim 12, wherein the second pulse width is 0.001 to 1 times the first pulse width or the second intensity is 1 to 100 times the first intensity.

14. The method of claim 1, wherein the first illumination modality is provided by a first illumination source and the second illumination modality is provided by a second illumination source.

15. The method of claim 14, wherein a first wavelength of illumination from the first illumination source is different from a second wavelength of illumination of the second illumination source.

16. The method of claim 1, further comprising detecting an actual output of at least one of the first illumination modality or second illumination modality to define a detected output.

17. The method of claim 16, further comprising adjusting the output of at least one of the first illumination modality or second illumination modality in response to the detected output.

18. The method of claim 16, wherein the actual output is detected with a photo diode.

19. The method of claim 17, further comprising
determining that an actual output of one of the first illumination modality or the second illumination modality at a first time instance has a first brightness level;
determining that an actual output of the one of the first illumination modality and second illumination modality at a later time instance has a second brightness level different from the first brightness level; and
adjusting the one of the first illumination modality or the second illumination modality to output from the second brightness level to the first brightness level.

20. The method of claim 19, further comprising adjusting at least one of a pulse width, a pulse rate or an intensity of the one of the first illumination modality or the second illumination modality to output the first brightness level.

21. The method of claim 1, wherein each illumination pulse from the first plurality of infra-red illumination pulses has a pulse width different from a pulse width of each illumination pulse from the second plurality of infra-red illumination pulses.

22. The method of claim 1, wherein each illumination pulse from the first plurality of infra-red illumination pulses has a pulse width substantially equal to a pulse width of each illumination pulse from the second plurality of infra-red illumination pulses.

23. The method of claim 1, further comprising controlling at least one of a pulse width, a pulse rate or an intensity of at least one of the first plurality of illumination pulses or the second plurality of infra-red illumination pulses to control power consumed by a corresponding illumination source.

24. The method of claim 1, wherein the first plurality of infra-red illumination pulses comprises a first pulse having a first pulse width and a first intensity and the second plurality of infra-red illumination pulses comprises a second pulse having second pulse width lower than the first pulse width and a second intensity higher than the first intensity.

25. The method of claim 24, wherein the second pulse width and the second intensity are selected so as create a perception in a human eye that the second pulse has a duration longer than the second pulse width.

26. The method of claim 1, wherein:
a) further comprises providing the first plurality of periodic infra-red illumination pulses of a first pulse width and having a first intensity; and
b) further comprises providing the second plurality of infra-red illumination pulses at a pulse width different from the first pulse width and/or a second intensity different from the first intensity.

27. A method of providing active illumination during biometry, comprising:
selectively providing, to an eye whose iris biometrics are being acquired by a plurality of image frame acquisitions as uniquely-identifiable biometric data for biometric matching, with a first illumination source, in a first illumination modality, the first plurality of periodic infra-red illumination pulses each synchronized with a corresponding one of a plurality of biometric image frame acquisitions during an acquisition period for acquiring the iris biometrics as uniquely-identifiable biometric data for biometric matching;
selectively providing, during the acquisition period to the eye whose iris biometrics are being acquired, with a second illumination source different from the first illumination source, in a second illumination modality, a second plurality of periodic infra-red illumination pulses distributed unevenly between the first plurality of infra-red illumination pulses during the acquisition period for acquiring the iris biometrics as uniquely-identifiable biometric data for biometric matching and having a substantially inverse waveform of the first plurality of infra-red illumination pulses; and
adjusting an output of at least one of the first illumination modality or the second illumination modality to avoid photosensitive epilepsy or to reduce flicker to an observer;
wherein each of the second plurality of infra-red illumination pulses occurs at a different time instant from any image frame acquisition, the distribution of the second plurality of illumination pulses varies between pairs of the first plurality of illumination pulses, and a difference in intensity observed by the observer between the first illumination modality and second illumination modality is minimized.

28. The method of claim 27, wherein a first wavelength of illumination from the first illumination source is different from a second wavelength of illumination of the second illumination source.

29. The method of claim 28, wherein the first wavelength is substantially in the range of 700-900 nm.

30. The method of claim 28, wherein the maximum distance between the first and second illumination sources is $D=0.0006\ R$.

* * * * *